3,049,233
PROCESS FOR SEPARATION OF SCHOENITE FROM SODIUM CHLORIDE BY MEANS OF FLOTATION

Gerlando Marullo and Giovanni Perri, Novara, Italy, assignors to Montecatini Società Generale per l'Industria Mineraria e Chimica, Milan, Italy, a corporation of Italy
No Drawing. Filed Feb. 2, 1960, Ser. No. 6,115
Claims priority, application Italy May 17, 1956
6 Claims. (Cl. 209—166)

This invention relates to a process for separating schoenite, namely, the double potassium and magnesium sulfate trihydrate ($K_2SO_4 \cdot MgSO_4 \cdot 6H_2O$), from a mixture of schoenite and sodium chloride or rock salt.

This is a continuation-in-part of our application Serial No. 658,710, filed May 13, 1957, now abandoned.

In U.S. Patent No. 2,766,885 of October 16, 1956, these applicants disclose and claim a flotation process for separating kainite from sodium chloride impurities of the crude mineral.

However, this flotation process is not readily applicable in cases where the kainite, used as a source of schoenite, is heavily contaminated with clay and consists of very small crystals having a particle size of less than 0.1 mm. in diameter. Such a mineral does not lend itself to concentration by flotation either because of excessive consumption of flotation aids which, in some instances, renders the method uneconomical, or because of excessive losses of the mineral which is retained in the froths and slime. Moreover, the separation of saline solutions from the solids becomes very difficult because of the minute crystalline state and the presence of clay which clogs the filters used to separate the liquid from the solid phase.

These difficulties have been overcome by means of the present invention and it is an object thereof to recover desirable mineral constituents from crude kainite.

The terms "rock salt" or "sodium chloride" throughout the specification mean a salt consisting substantially of NaCl and eventually of other secondary salts formed during the processes of converting kainite to schoenite, but with exclusion of potassium salts.

In the aforementioned patent, the use of a cationic compound, consisting of a long chain alkylamine carboxylic acid as a flotation agent has been disclosed, together with the use of an aliphatic or aromatic alcohol in connection with a flotation process for the separation of kainite from sodium chloride. However, the foregoing combination of flotation aids is not useful where artificial schoenite is mixed with sodium chloride. If they are employed, a very impure artificial schoenite is collected in the froths and the yields are very low.

This is illustrated by the following experimental results:

| Product | Percent by Weight | $K_2O$, Percent | Na, Percent | $K_2O$, yield | reactants, g./ton | |
|---|---|---|---|---|---|---|
| | | | | | amine acetate | amyl alcohol |
| artificial Schoenite + NaCl mixture | 100 | 12 | 18.5 | 100 | | |
| floated mineral | 57.5 | 17 | 8.5 | 81.5 | 300 | 80 |
| tailings | 42.5 | 5.2 | 28 | 18.5 | | |

Now we made the unexpected discovery that artificial schoenite of sufficient purity remains in the froth and can be collected therefrom at high yields if a salt of a higher aliphatic acid containing 16–20 carbon atoms or the corresponding free acid is used together with a salt of a long chain alkylamine containing 12–20 carbon atoms.

Generally speaking, the flotation is carried out by suspending 25 to 35% of the mixture of artificial schoenite and sodium chloride in a saline solution of a composition which does not cause any ion exchange during the period of flotation.

The method disclosed in the present application is suitable for raw materials constituted of a mixture of artificial or synthetic schoenite and sodium chloride. It is also especially suitable for mixtures of crude kainite mineral and sodium chloride and containing clay as an impurity. The kainite must of course first be transformed into artificial schoenite, and the present process is particularly useful when the kainite is present in the form of very fine crystals owing to the presence therewith of clay. As previously defined herein, the term "very fine crystals" designates those having a particle size of less than 0.1 mm. in diameter.

Heretofore, the flotation of kainite mineral has been very difficult owing to the great consumption of the reactants and large losses of the mineral becoming mixed with the froths and clay. Such difficulties are easily overcome by the process of the present invention, because the transformation of kainite into schoenite produces well formed crystals of artificial schoenite which are easily separated from clay by decantation.

The following table, relating to the use of extremely fine kainite mineral as starting material, is presented to indicate the percentages of the respective mineral, in order to illustrate the formation of large crystals of schoenite.

| Crystal size in mm. | Example 1 | | Example 2 | |
|---|---|---|---|---|
| | Percent of Kainite mineral | Percent of artificial Schoenite + NaCl | Percent of Kainite mineral | Percent of artificial Schoenite + NaCl |
| >0.6 | | 2.18 | | 2.76 |
| >0.4 | 1.98 | 6.08 | | 7.90 |
| >0.3 | 4.62 | 33.52 | 5.12 | 49.09 |
| >0.2 | 5.20 | 34.26 | 6.62 | 38.76 |
| >0.1 | 40.40 | 16.00 | 27.81 | 0.89 |
| >0.06 | 23.50 | 5.90 | 25.11 | 0.60 |
| <0.06 | 34.30 | 1.50 | 35.35 | |

The first five numerals in the third column above make a total of 92.04, and in the fifth column above make a total of 98.51. Thus, the crystal size of the schoenite-NaCl mixture obtained was greater than 0.1 mm. for at least 90% thereof.

The turbid suspension of schoenite and NaCl is conditioned for 5 to 10 minutes with 200–400 g./ton of a higher aliphatic acid such as oleic acid, or a salt thereof (e.g. sodium oleate). The cationic reactant, consisting of 100–300 g./ton of a salt of a long chain alkylamine (e.g. tallow amine acetate that is: stearyl-oleyl-palmitic amine acetate) and 80–120 g./ton of an aliphatic or aromatic alcohol (e.g. amyl alcohol) is then added to the turbid suspension. The amount of reactants required within the foregoing limitations, depends upon the residual amount of slime in the turbid suspension.

The turbid suspension is then poured into the flotation cells. The artificial schoenite separates after about 10 minutes and collects in the froths, while the sodium chloride remains in the residual turbid suspension. By means of filtration solids are separated from the liquids. A portion of this liquid is employed to bring the turbid suspension which feeds the flotation cells to the desired dilution.

The following examples will further illustrate the flotation step of this invention:

Example A

| Product | Weight, percent | K₂O, percent | Na, percent | K₂O, Yield | reactants, g./ton | | |
|---|---|---|---|---|---|---|---|
| | | | | | sodium oleate | tallow amine acetate | amyl alcohol |
| artificial Schoenite-NaCl mixture | 100 | 12 | 18.5 | 100 | | | |

If concentrates of higher purity are desired, the flotation of the separated product can be repeated without any further addition of reactants.

Example B

| Products | Weight, percent | K₂O, percent | Na, percent | K₂O, Yield | reactants, g./ton | | |
|---|---|---|---|---|---|---|---|
| | | | | | sodium oleate | tallow amine acetate | amyl alcohol |
| artificial Schoenite-NaCl mixture | 100 | 12 | 18.5 | 100 | | | |
| floated mineral | 48.7 | 21.5 | 0.7 | 87.3 | 200 | 220 | 10 |
| residue of 2nd flotation | 9.8 | 12.5 | 16.5 | 10.2 | | | |
| waste residue | 41.5 | 0.8 | 36 | 2.5 | | | |

Artificial schoenite containing small amounts of NaCl after having been washed passes to the conversion to $K_2SO_4$.

If the flotation mixture consists of kainite and artificial schoenite as well as sodium chloride, the kainite can be recovered according to the aforementioned Patent No. 2,766,885 and the artificial schoenite can be subsequently recovered by adding a higher fatty acid and an additional amount of amine.

Example C

| Products | Weight, percent | Percent K₂O as KCl | Percent K₂O as K₂SO₄ | Percent Na | KCl yield | K₂SO₄ yield | total K₂O yield | reactants, g./ton | | |
|---|---|---|---|---|---|---|---|---|---|---|
| | | | | | | | | sodium oleate | tallow amine acetate | amyl alcohol |
| mixture of Kainite and artificial Schoenite | 100 | 4.5 | 8.3 | 16 | 100 | 100 | 100 | | | |
| floated Kainite | 26 | 15 | 3 | 1.95 | 86.6 | 7.2 | | | 150 | 60 |
| floated artificial Schoenite | 40 | 0.6 | 18.7 | 2.76 | 10.9 | 90.3 | 97.5 | 250 | 200 | 50 |
| tailings | 34 | 0.3 | 0.7 | 36.2 | 2.5 | 2.5 | 2.5 | | | |

Example D

A mixture of schoenite and sodium chloride having 12.0% $K_2O$ and 18.5% sodium chloride by weight is suspended in its solution of equilibrium so that the concentration of the solid portion in the resulting turbid suspension amounts to 35% by weight.

The turbid suspension is conditioned for 5 minutes with 200 g./ton of sodium oleate.

Successively 220 g./ton of n-hexadecyl amine acetate and 100 g./ton amyl alcohol are added.

After flotation the following products have been obtained:

| Products | Weight, percent | K₂O, percent | Na, percent | K₂O, yield |
|---|---|---|---|---|
| Schoenite-NaCl mixture | 100 | 12 | 18.5 | |
| floated mineral | 58.5 | 20 | 3.5 | 97.5 |
| waste residue | 41.5 | 0.8 | 36.0 | 2.5 |

If concentrates of higher purity are desired, the flotation of separated product can be repeated without any further addition of reactants.

Further Examples E-G have been carried out using the same mixture of the above-illustrated Example D and other various reactants as listed in each example.

Example E

|  | G./ton |
|---|---|
| Enatic acid | 300 |
| n-Nonyl amine | 200 |
| Amyl alcohol | 100 |

Results:

| Products | Weight, percent | K₂O, percent | Na, percent | K₂O, yield |
|---|---|---|---|---|
| Schoenite-NaCl mixture | 100 | 12.0 | 18.5 | |
| floated mineral | 55 | 21.2 | 0.7 | 97.5 |
| waste residue | 45 | 0.8 | 36 | |

Example F

|  | G./ton |
|---|---|
| Laurylic acid | 300 |
| n-Undecyl-amine | 200 |
| Amyl alcohol | 100 |

The acid and the amine are used in their soluble form as sodium salt respectively as chlorohydrate.

Results:

| Products | Weight, percent | K₂O, percent | Na, percent | K₂O, yield |
|---|---|---|---|---|
| Schoenite-NaCl mixture | 100 | 12.0 | 18.5 | |
| floated mineral | 54.0 | 21.4 | 0.8 | 96 |
| waste residue | 46.0 | 1.0 | 35.2 | |

Example G

|  | G./ton |
|---|---|
| Myristic acid | 300 |
| n-Decyl amine | 200 |
| Amylic alcohol | 100 |

Results:

| Products | Weight, percent | K₂O, percent | Na, percent | K₂O, yield |
|---|---|---|---|---|
| Schoenite-NaCl mixture | 100 | 12.0 | 18.5 | |
| floated mineral | 57.8 | 20.0 | 2.5 | 96 |
| waste residue | 42.2 | 1.0 | 34.8 | |

The experiments of the above examples have been carried out using exclusively schoenite-NaCl mixtures obtained by means of transformation of kainite minerals.

We claim:

1. Process for separation by flotation of schoenite, consisting of the double hydrated salt of potassium and magnesium sulfate, from natural or artificially prepared mixtures of schoenite and sodium chloride, comprising the steps of adding to a 25 to 35% suspension of said mixture 100 to 300 grams per ton of a first flotation agent selected from the group consisting of straight-chain aliphatic acids having 7 to 20 carbon atoms and salts of said acids, 100 to 300 grams per ton of a second flotation agent selected from the group consisting of primary aliphatic amines having 6 to 20 carbon atoms and salts of said primary aliphatic amines, and 80 to 100 grams per ton of an alcohol frother.

2. Process for separation by flotation of schoenite, consisting of the double hydrated salt of potassium and magnesium sulfate, from natural or artifically prepared mixtures of schoenite and sodium chloride and containing impurities comprising clay, comprising the steps of adding to a 25 to 35% suspension of said mixture 100 to 300 grams per ton of a first flotation agent selected from the group consisting of straight-chain aliphatic acids having 7 to 20 carbon atoms and salts of said acids, 100 to 300 grams per ton of a second flotation agent selected from the group consisting of primary aliphatic amines having 6 to 20 carbon atoms and salts of said primary aliphatic amines, and 80 to 100 grams per ton of an alcohol frother consisting of a primary aliphatic alcohol having 4 to 10 carbon atoms.

3. Process according to claim 1, said primary aliphatic amine salt being the tallow amines acetate formed substantially of the acetate of a mixture of oleic, stearic and palmitic amines obtained from tallow, and having a molecular weight of about 300.

4. Process according to claim 1, wherein said first flotation agent is sodium oleate.

5. The method of separating artificial schoenite consisting of the double hydrated salt of potassium and magnesium sulfate from sodium chloride by flotation, comprising the steps of adding to a 25 to 35% suspension of a crystalline mixture of said artificial schoenite and sodium chloride 200 to 400 g./ton of a compound selected from the group consisting of aliphatic acids containing 16 to 20 carbon atoms and salts of said acids, adding 100 to 300 g./ton of a salt of a long chain alkylamine comprising 12 to 20 carbon atoms, and adding gradually 80 to 120 g./ton of an alcohol having 4 to 10 carbon atoms while converting said suspension into a frothy liquid, whereby the artificial schoenite passes into the frothy liquid and the sodium chloride remains in the residue.

6. The method of separating artificial schoenite consisting of the double hydrated salt of potassium and magnesium sulfate from sodium chloride by flotation, comprising the steps of adding to a 25 to 35% suspension of a crystalline mixture of said artificial schoenite and sodium chloride 200 to 400 g./ton of a compound selected from the group consisting of oleic acid and sodium oleate, adding 100 to 300 g./ton to tallow amine acetate formed substantially of the acetate of a mixture of oleic, stearic and palmitic amines obtained from tallow, and having a molecular weight of about 300, and adding gradually 80 to 120 g./ton of amyl alcohol while converting said suspension into a frothy liquid, whereby the artificial schoenite passes into the frothy liquid and the sodium chloride remains in the residue.

References Cited in the file of this patent
UNITED STATES PATENTS

| 2,297,664 | Tartaron | Sept. 20, 1942 |
| 2,766,885 | Marullo et al. | Oct. 16, 1956 |

OTHER REFERENCES

Kasin: "Journal of Applied Chemistry," U.S.S.R., T XII, Number 6, pages 836–843, 1939.